United States Patent [19]
Van Lerberghe

[11] Patent Number: 6,004,690
[45] Date of Patent: Dec. 21, 1999

[54] BATTERY-OPERATED DEVICE AND BATTERY UNIT

[75] Inventor: Steven J. W. Van Lerberghe, Eindhoven, Netherlands

[73] Assignee: U.S. Philips Corporation, New York, N.Y.

[21] Appl. No.: 08/988,512

[22] Filed: Dec. 10, 1997

[30] Foreign Application Priority Data

Dec. 13, 1996 [EP] European Pat. Off. .............. 96402738

[51] Int. Cl.$^6$ .................................................. H01M 2/10
[52] U.S. Cl. ........................................... 429/100; 429/123
[58] Field of Search ................................ 429/162, 96, 99, 429/100, 127, 163, 153, 159, 123, 97

[56] References Cited

U.S. PATENT DOCUMENTS

| | | | |
|---|---|---|---|
| 4,670,664 | 6/1987 | Hara ......................................... | 429/127 |
| 4,784,926 | 11/1988 | Sato .......................................... | 429/96 |
| 4,904,549 | 2/1990 | Goodwin et al. .......................... | 429/97 |
| 5,183,714 | 2/1993 | Mitsui et al. ............................. | 429/123 |
| 5,314,763 | 5/1994 | Aksoy et al. .............................. | 429/97 |
| 5,326,652 | 7/1994 | Lake ......................................... | 429/127 |
| 5,434,018 | 7/1995 | Sasaki et al. ............................. | 429/100 |
| 5,631,101 | 5/1997 | Amero, Jr. ............................. | 429/97 X |
| 5,863,218 | 1/1999 | Quat et al. ................................. | 429/96 |

FOREIGN PATENT DOCUMENTS

0691696A1  1/1996  European Pat. Off. ......... H01M 2/10

*Primary Examiner*—Maria Nuzzolillo
*Assistant Examiner*—Susy Tsang

[57] ABSTRACT

A battery unit is designed for battery-operated appliances such as cordless telephones, notebook computers, video cameras, etc., and comprises an envelope within which one or several electrochemical cells are accommodated as well as electrical connection contacts, which envelope has at least approximately the shape of a closed rectangular block. To provide a satisfactory and stable guiding, ridges and/or grooves are present at least adjacent the side surfaces of the envelope for mating with corresponding grooves and/or ridges of a housing of a battery-operated appliance to provide a sliding possibility for the battery unit. The envelope is further provided with external asymmetrical locating portions for cooperating with correspondingly shaped and positioned locating portions of the battery-operated appliance so as to prevent an incorrect insertion of the battery unit. The connection contacts are present adjacent the lower surface of the envelope.

9 Claims, 3 Drawing Sheets

BATTERY-OPERATED DEVICE AND BATTERY UNIT

BACKGROUND OF THE INVENTION

The invention relates to a battery unit for battery-operated devices such as cordless telephones, notebook computers, video cameras, etc., provided with an envelope within which one or several electrochemical cells are present and which comprises electrical connection contacts, said envelope having the shape at least approximately of a closed rectangular block with a rectangular upper surface, a rectangular lower surface opposite thereto, long side surfaces, and short side surfaces.

The invention further relates to a battery-operated device provided with such a battery unit.

The use of electrical appliances which are not supplied through the mains, i.e. battery-operated appliances becomes more and more common. The use of portable telephones has particularly increased during the past years, as a result of which a considerable increase in the use of rechargeable batteries has taken place. The mass of the battery accounts for a considerable portion of the total mass of the appliance especially in light portable equipment such as said cordless telephones, but also, for example, notebook computers. It is an object on the one hand to give the appliance the longest possible period of use independently of the mains, while on the other hand it is the object to make the appliance as light as possible. These two objects are mutually conflicting because a long period of use implies a greater battery mass, i.e. a greater weight of the appliance. Considerable research is accordingly devoted to the possibilities of realizing batteries of very small mass but nevertheless high power. Work is going on, for example, in the development of very flat batteries provided with one or several electrochemical cells.

OBJECTS AND SUMMARY OF THE INVENTION

The invention has for its object to provide a battery unit of the kind mentioned in the opening paragraph which contributes to a further reduction of the mass of battery-operated appliances.

The invention is for this purpose characterized in that ridges and/or grooves are present at least adjacent the long side surfaces of the envelope for guiding the battery unit with sliding possibility in mating grooves and/or ridges of a housing of a battery-operated appliance, and in that the connection contacts are present adjacent the lower surface of the envelope.

Since ridges and/or grooves are present in the battery unit according to the invention for guiding, i.e. sliding the battery unit in mating grooves and/or ridges of a housing of a battery-operated appliance, the battery can be satisfactorily supported by the housing of the battery-operated appliance in spite of a small thickness dimension and can form part of an outer wall of the battery-operated appliance. This has the advantage that the upper surface of the battery unit at the same time serves as part of the housing of the battery-operated appliance, so that a contribution is made to a reduction in the total mass thereof. The grooves and/or ridges may be provided symmetrically or asymmetrically.

An advantageous embodiment of a battery unit according to the invention is characterized in that the envelope is provided with external asymmetrical locating portions for cooperating with correspondingly shaped and placed locating portions of a battery-operated appliance so as to prevent an incorrect placement of the battery unit. An incorrect placement of the battery unit on the appliance whereby the battery-operated appliance would not function, and in addition the battery unit could be exposed to unfavorable loads, is prevented in that the envelope of the battery unit is suitably provided with external asymmetrical locating portions which cooperate with mating portions of the battery-operated appliance. Said unfavorable loads are undesirable in view of the envisaged small mass of the battery unit and accordingly the preferably comparatively thin and fragile construction thereof.

The connection contacts of the battery unit are present adjacent the lower surface of the envelope and accordingly face towards the interior of the battery-operated appliance. It is ensured by means of suitable provisions on the battery-operated appliance that an electrical contact with the battery unit is automatically achieved when the battery unit is put into place.

An interesting embodiment of the invention is characterized in that the battery unit has a thickness of at most a few millimeters, and in that the battery unit is elastically flexible about an axis which is parallel to the longitudinal direction of the envelope. This embodiment is particularly suitable for very light battery-operated appliances such as, for example, cordless telephones or other communication equipment which has to be easy to carry in the pocket of a garment. The very thin and flexible design of the battery unit affords a greater freedom of design for the battery-operated appliance because the bent battery unit can be seamlessly integrated with a curved wall of the housing of the battery-operated appliance. Dimensional adaptations in the form of an additional mass of the battery envelope need not be realized as a result.

An interesting embodiment of the invention, furthermore, is one which is characterized in that the connection contacts can be covered by means of a movable cover member which is movable between an open position in which the connection contacts are accessible from the exterior and a closed position in which the connection contacts are covered. The connection contacts of the battery unit in this embodiment are adequately covered, so that a loose battery unit, for example serving as a spare battery, can be readily carried by a user in the pocket of a garment, a purse, a suitcase, etc.

The preceding embodiment may in addition be characterized in that resilient means are present which load the movable cover member with spring pressure towards the closed position, in that the cover member is movable in a plane parallel to the upper and lower surfaces of the battery unit, in that the cover member is provided with abutment means, and in that the cover member is movable from the closed position into the open position through the exertion of a force on the abutment means. The movable cover member in this battery unit according to the invention can be automatically opened upon the placement of the battery unit in the correct position on a battery-operated appliance through cooperation between part of the appliance and the cover member. This will be explained in more detail further below.

A next embodiment of the invention is important when the battery unit is to be used in appliances which require supply voltages of different levels, or appliances with mutually differing supply voltages, and is characterized in that the positions of the connection contacts present on the battery unit form part of a set of standardized positions. The connection contacts could be arranged, for example, in the shape of a bit pattern next to one another, so that eight different possibilities can be defined by means of three positions. A next embodiment of the invention is of major importance in this connection and is characterized in that the envelope, the ridges and/or grooves, the locating portions, the connection contacts, the cover member, the abutment means, etc., comply with a previously defined standard for battery units and battery-operated appliances as regards their construction and placement.

This latter embodiment renders it possible to use standardized battery units according to the invention for a plurality of applications, battery units originating from different manufacturers being capable of cooperating with different kinds of battery-operated appliances also originating from different manufacturers. It is also possible for recognition contacts to be applied to the lower side of the battery unit, or alternative identifying marks such as a bar code, so as to recognize the capacitance, voltage, or other characteristics of the battery unit. Read-out means and processing means are present in the battery-operated appliance in that case for interpreting the above marks and operating the battery-operated appliance accordingly.

BRIEF DESCRIPTION OF THE DRAWINGS

The invention will now be explained in more detail with reference to the drawing which shows a few embodiments of the invention, without being limited thereto, and in which.

DETAILED DESCRIPTION OF THE PREFERRED EMBODIMENT

Figure 1:
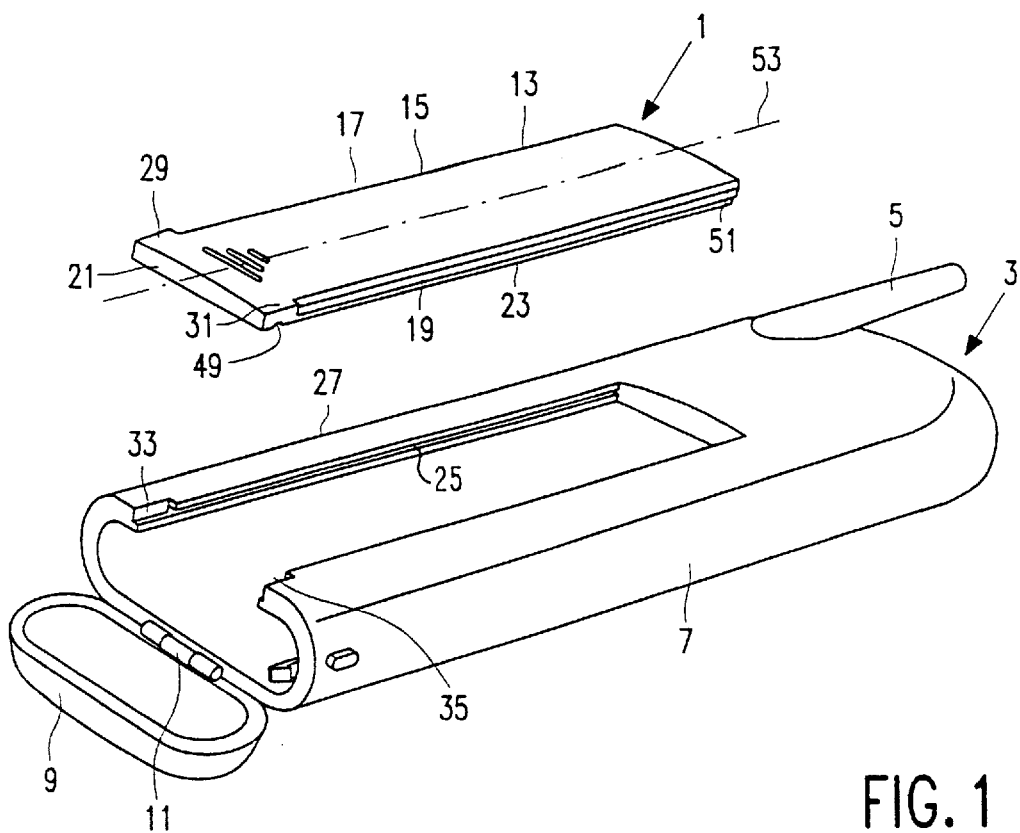
FIG. 1 is a diagrammatic exploded perspective view of the housing of a possible portable telephone and battery unit according to the invention.

FIG. 1 shows a battery unit 1 for battery-operated appliances such as a cordless telephone 3. The telephone has an antenna 5, a housing 7, and a lid 9 which is diagrammatically shown and which hinges about a hinge 11 for closing the rear of the housing. The battery unit 1 is provided with an envelope 13, for example made of synthetic resin or metal, within which several electrochemical cells are present, which cells are not shown and not essential to the invention. The envelope 13 approximately has the shape of a closed rectangular block with a rectangular upper surface 15, a rectangular lower surface 55 (see FIG. 4) opposed thereto, long side surfaces 17 and 19, and short side surfaces of which only the short side surface 21 is visible in the drawing.

According to the invention, ridges are present adjacent the long side surfaces 17, 19 of the envelope 13. Only the ridge 23 adjacent the long side surface 19 is visible in FIG. 1. An identical ridge (FIG. 4) is present adjacent the side surface 17. These ridges serve for guiding, i.e. sliding, the battery unit in grooves of the housing 7 of the telephone 3. Only a groove 25 is visible in FIG. 1 at the side of an opening 27 in the housing which serves to accommodate the battery unit 1. A substantially identical groove not visible in the drawing is present at the other side of the opening 27, opposite the groove 25.

To prevent an incorrect placement of the battery unit 1 on the housing 7 of the telephone 3, the envelope 13 of the battery unit is provided with external asymmetrical locating portions 29 and 31 which cooperate with correspondingly shaped and placed locating portions of the telephone 3. At the open end of the opening 7, in fact, this telephone is provided on either side with a void 33, 35 in which the respective portion 29, 31 of the battery unit 1 can be accommodated. The portions of the housing 7 visible in FIG. 1 and defining the voids 33 and 35 form the locating portions of the housing 7 of the telephone which mate with the locating portions 29 and 31. The ridges 23 and the grooves 25, of the battery unit and of the telephone, respectively, are also asymmetrically placed. The ridges 23 lie closer to the lower surface of the housing 13 of the battery unit than to the upper surface 15 thereof. Owing to this asymmetrical placement of the ridges 23 and to the presence of the two locating portions 29 and 31, which may or may not be of different shape, it is impossible to place the battery unit upside down or wrong end first on the housing 7.

Figure 2:
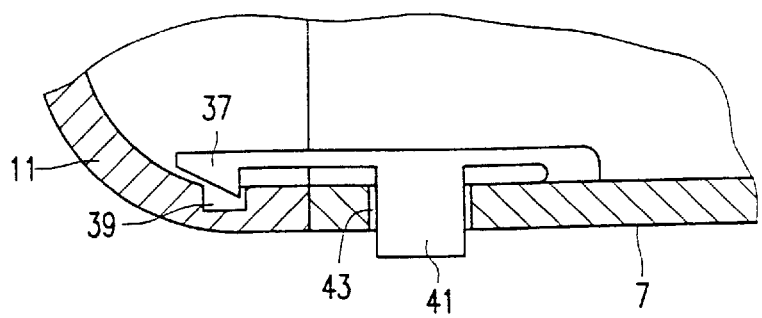
FIG. 2 shows a few portions of the housing of the telephone of FIG. 1 in detail in cross-sectional view.

The lid 9 of the housing 7 of the telephone may be closed after placement of the battery unit 1 in that it is pivoted about the hinge 11 and is locked with a locking bracket 37, see also the cross-section of FIG. 2. The locking bracket enters a recess 39 of the lid 9 and may be provided with a pushbutton 41 which projects through a recess 43 of the housing 7 to the exterior. The locking bracket 37 may, for example, be integrally manufactured from an elastic material.

Figure 3:
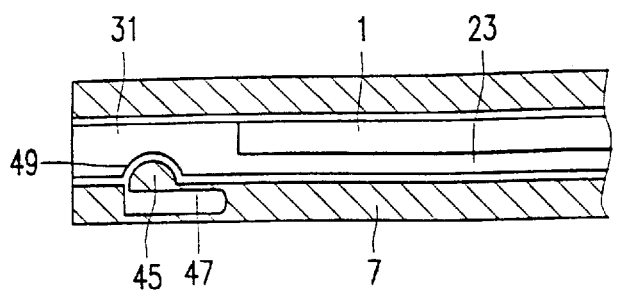
FIG. 3 shows another detail in cross-section of the housing of the telephone of FIG. 1.

FIG. 3 shows a detail of a locking stud 45 which is connected to and forms an integral whole with the housing 7 of the telephone via a resilient portion 47. The locking stud cooperates with a recess 49 of mating shape which is present at the lower side of the locating portion 31 of the battery unit. When the battery unit is inserted into the housing 7 of the telephone, the battery unit 1 is locked resiliently in the housing by means of the locking stud 45 in that the locking stud 45 snaps itself resiliently into the recess 49.

FIG. 1 shows a telephone with a hinging rear lid, but this is not essential to the invention. The rear of the telephone may alternatively be entirely closed with the exception of an opening corresponding to the shape of the rear 21 of the battery unit so that, after the battery unit has been provided, the lower side of the telephone and the rear of the battery unit lie together in a common plane. It is further noted that the ridges 23 each have a small bevel surface 51 at the front of the battery unit. These bevel surfaces serve to facilitate the insertion of the ridges of the battery unit into the grooves of the housing of the telephone in a usual manner.

The battery unit 1 preferably has a thickness of at most a few millimeters, for example between 0.5 and 2 mm. This small thickness and a suitable choice of the construction of the electrochemical cells present inside the envelope 13 of the battery unit and of the material of the envelope itself can achieve that the battery unit is elastically flexible about an axis 53 which is parallel to the longitudinal direction of the envelope. As a result, the battery unit is capable of adapting itself to the curvature of the housing 7 of the telephone. The thickness of the battery unit 1, however, may increase in the case of battery units having a considerably greater capacity than a very thin battery. This increase then lies outside the plane portion of the "normal" housing 7. When such a thicker battery unit is manufactured, an external curvature may be adapted to the curvature of the housing of the battery-operated appliance for which the battery unit is designed. In this latter case, an additional adapter part (not shown) may be provided as a kind of ring around the battery unit which has been passed into the battery-operated appliance. This has the advantage that the battery-operated appliance externally has a "smooth" shape again after the battery unit and the adapter part have been inserted.

Figure 4:
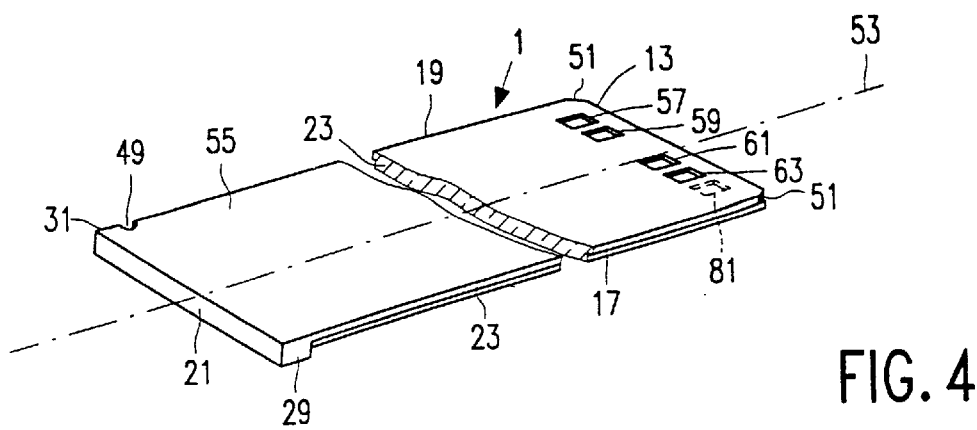
FIG. 4 is a perspective bottom view of the battery unit shown in FIG. 1, locally interrupted.

In FIG. 4, which shows the battery unit 1 viewed from the lower side on a somewhat enlarged scale omitting a central portion, it is apparent that a number of electrical connection contacts 57, 59, 61 and 63 are present in the lower surface 55 of the battery unit. As is visible in the Figure, these connection contacts are somewhat recessed into the housing 13 of the battery unit. The connection contacts make contact, for example, with various electrochemical cells within the battery unit or with several connection points of separately present cells, so that alternative supply voltages can be obtained, or several mutually differing supply voltages at the same time, through a suitable choice of the electrical connection of a battery-operated appliance to the connection contacts shown.

Figure 5:
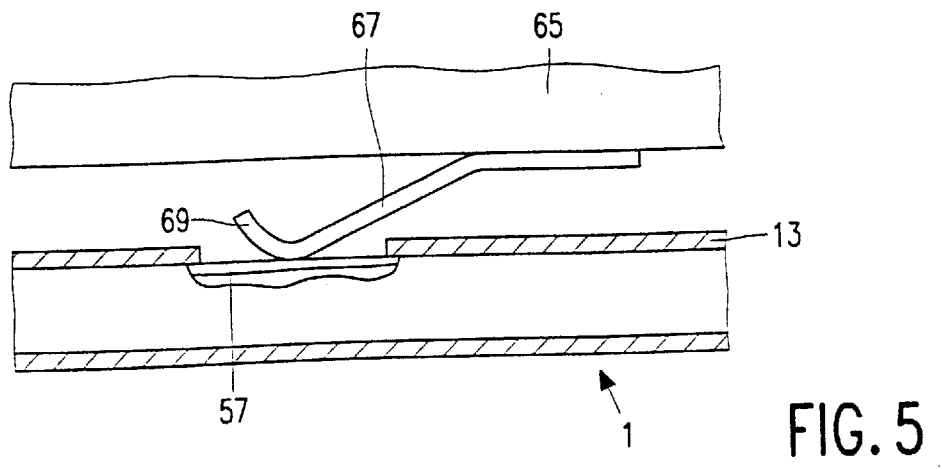
FIG. 5 shows in cross-section how a portion of the battery of FIG. 4 cooperates with portions of a battery-operated appliance.

FIG. 5 diagrammatically shows a simple example of the manner in which the telephone 3 may make contact with the connection contact 57 of the battery unit. A carrier 65, for example a printed circuit board, present in the telephone is provided with a resilient metal contact spring 67 in the form of a blade spring with a bent end 69. With this end, the blade spring 67 resiliently contacts the connection contact 57 of the battery unit. When the battery unit is shifted in longitudinal direction, the blade spring 67 slides over the envelope 13 of the battery unit without causing damage. The blade spring 67 does not rest on the connection contact 57 until the moment the battery unit has reached its final position in the housing 7 of the telephone. Obviously, alternative contact elements may be used in the telephone and/or in the battery, which elements, however, are familiar to those skilled in the art and are accordingly not discussed in any detail here.

Figure 6:
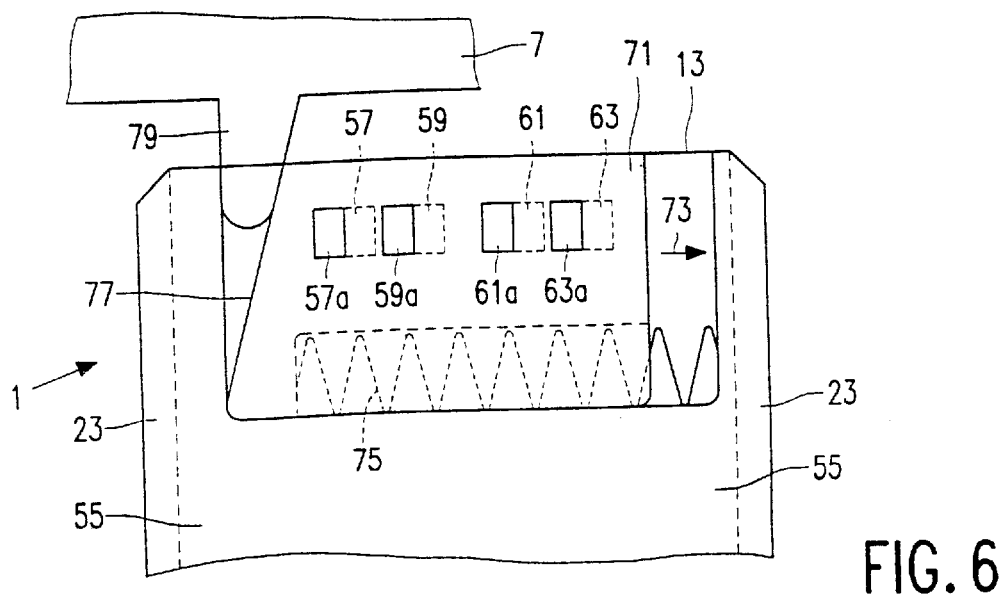
FIG. 6 is a plan view of parts of a modification of a battery unit of FIG. 1 in cooperation with part of a telephone.

FIG. 6 shows how the battery unit 1 of FIG. 4 may be modified through the addition of a cover member in the form of a slide 71 at the front of the lower wall 55. The cover member is movable between a closed position shown in FIG. 6 in which the connection contacts 57, 59, 61 and 63 are covered, and an open position which is not shown. The slide 71 is provided with openings 57a, 59a, 61a and 63a which correspond to said connection contacts. Sliding of the slide 71 over the width of these openings to the right in FIG. 6, i.e. in the direction of arrow 73, causes the openings to lie above the connection contacts, so that the latter are accessible from the outside. The slide is provided with a diagrammatically depicted compression spring 75 which urges the slide resiliently towards the closed position shown in FIG. 6. The slide is movable in a plane parallel to the lower surface 55 of the battery unit and somewhat resembles a sliding member which is known per se from its use in some magnetic media such as magnetic tape cassettes or magnetic computer diskettes. Since this technology is generally known, the construction of the slide 71, the resilient means 75, and the corresponding parts of the envelope 13 of the battery unit for retaining and guiding the slide are not discussed in any detail. Indeed, they are not of essential importance for the invention as such.

The slide 71 has a sloping edge 77 which serves as an abutment for cooperating with a projection 79 which is present on the telephone housing 7. As is diagrammatically shown in FIG. 6, the projection 79 cooperates with the sloping edge 77. The position of the projection 79 relative to the battery unit 1, and in particular relative to the slide 71, is so chosen that the projection 79 will hit against the sloping edge 77 of the slide 71 at a given moment during the insertion of the battery unit into the telephone housing, and the slide 71 is shifted from the closed position into the open position, in which the connection contacts are freely accessible from the outside, by the projection 79 upon a further movement of the battery unit in the direction of the arrow 73 towards the final position.

The positions of the connection contacts present on the battery unit belong to a set of standardized positions. Contacts may or may not be present in said standardized positions. FIG. 4, for example, shows a position 81 which is not occupied by a connection contact in the embodiment drawn. By basing themselves on standardized positions, the designers have the possibility of selecting the correct supply voltage at all times, or the correct combination of supply voltages, while the manufacturer of the battery unit has the option of manufacturing various types of batteries which do not all supply the same voltage or combination of voltages.

It is of major importance in this connection that the invention can be so implemented that the envelope 13, the ridges 23, the grooves 25, the locating portions 29 and 31, the connection contacts 57, 59, 61, 63, the cover member 71, the abutment 77, etc., comply with a previously defined standard for battery units and battery-operated appliances as regards their constructions and positions. Standardization guarantees a good mutual cooperation of battery units and appliances even when they originate from different manufacturers.

Figure 7:
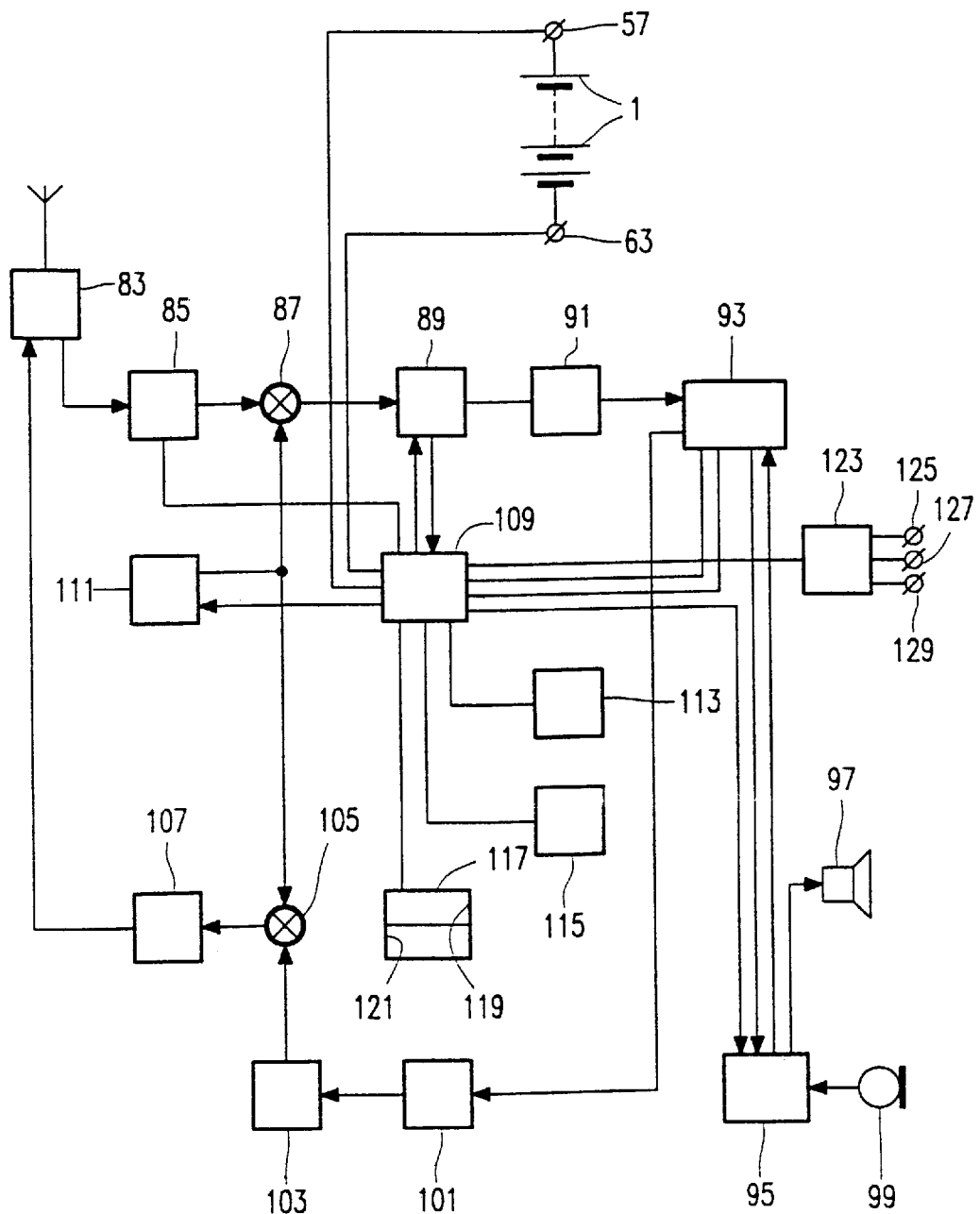
FIG. 7 is a block diagram of the telephone circuit. Corresponding parts have been given the same reference numerals in the Figures.

FIG. 7 shows a block diagram of an electrical circuit of the cordless telephone 3. The telephone 3 has a receiver path and a transmitter path coupled to an antenna switch 83. The receiver path comprises a cascade circuit of a tunable HF filter 85, a mixing stage 87, a switchable intermediate frequency filter 89, a demodulator 91, a TDMA ("Time Division Multiple Access") control device 93, a speech CODEC (COding and DECoding device) 95, and a loudspeaker 97. The transmitter path comprises a cascade circuit of a microphone 99, the speech CODEC 95, the TDMA control device 93, a modulator 101, an offset oscillator 103, a mixing stage 105, and a power amplifier 107. A microprocessor 109 for controlling the functions of the telephone 3 is also provided. Usual telephone functions such as the control of a frequency generating circuit 111, which serves to tune the telephone 3 to a certain channel, the control of the TDMA control device 93, scanning of a keyboard 113, and controlling a display device 115 such as an LCD ("Liquid Crystal Display") are not described in any more detail here because such functions are known per se from the prior art. The telephone 3 further comprises a memory device 117 which comprises a non-volatile memory portion 119 and a volatile memory portion 121 coupled to the microprocessor 109. The non-volatile memory portion 119 contains a program which controls the functions of the telephone 3. Furthermore, the electrical connection contacts 57 and 63 for connecting the battery unit 1 to the electrical circuits of the telephone 3 are shown as described with reference to FIG. 4. Only the supply of the microprocessor 109 is shown for the sake of simplicity. The telephone 3 further comprises a decoding circuit 123 which is coupled to the microprocessor 109. The decoding circuit 123 is coupled at its input side to identification contacts 125, 127 and 129 which, like the contacts 57, 59, 61 and 63, are present at the lower side of the battery unit 1. The identification contacts 125, 127 and 129 serve to recognize the capacity, voltage, and other characteristics of the battery unit 1 in conjunction with the program in the non-volatile memory portion 119. The microprocessor 109 may be programmed, for example, for recognizing a three-bit capacity code and for indicating an expected average conversation time and/or standby time on the display device 115 in dependence thereon.

Although the invention was explained in detail above with reference to only a single embodiment, the invention is by no means limited thereto, but on the contrary covers each and every embodiment which is possible within the scope of the appended claims. The essential feature is that the battery unit according to the invention is provided with guides at its long sides in the form of ridges and/or grooves so that even battery units with a great length/width ratio and with a small thickness in comparison with the other dimensions can be accommodated in the housing of a battery-operated appliance in a stable and reliable manner and can form part of the outer wall of the housing.

I claim:

1. A battery unit for a battery-operated device, said battery unit comprising:

an envelope within which at least one electrochemical cell is present, and electrical connection contacts, said envelope substantially being shaped as a closed rectangular block with a rectangular upper surface, a rectangular lower surface opposite thereto, long side surfaces, and short side surfaces, ridges being present adjacent the long side surfaces of the envelope for guiding the battery unit with sliding possibility in mating grooves of a housing of the battery-operated device, said ridges of said envelope uninterruptedly extending alone the long side surfaces of said envelope, and said mating grooves of said housing being uninterruptedly extending grooves, and the connection contacts being present adjacent the lower surface of the envelope.

2. A battery unit as claimed in claim 1, wherein the envelope is provided with external asymmetrical locating portions for cooperating with correspondingly shaped and placed locating portions of the battery-operated device so as to prevent an incorrect placement of the battery unit.

3. A battery unit as claimed in claim 1 wherein the battery unit has a thickness between 0.5 and 2 millimeters, and the battery unit is elastically flexible about an axis which is parallel to the longitudinal direction of the envelope.

4. A battery unit as claimed in claim 1, wherein the connection contacts are coverable by means of a movable cover member which is movable between an open position in which the connection contacts are exposed and a closed position in which the connection contacts are covered.

5. A battery unit as claimed in claim 4, wherein resilient means are present which load the movable cover member with spring pressure towards the covering position, the cover member is movable in a plane parallel to the upper and lower surfaces of the battery unit, the cover member is provided with abutment means, and the cover member is movable from the covering position into the open position through the exertion of a force on the abutment means.

6. A battery-operated device provided with a housing and with a battery unit, said battery unit comprising:

an envelope within which at least one electrochemical cell is present, and electrical connection contacts, said envelope substantially being shaped as a closed rectangular block with a rectangular upper surface, a rectangular lower surface opposed thereto, long sides surfaces, and short sides surfaces, ridges being present adjacent the long side surfaces of the envelope for guiding the battery unit with sliding possibility in mating grooves of a housing of the battery-operated device, said ridges of said envelope uninterruptedly extending along the long side surfaces of said envelope, and said mating grooves of said housing being uninterruptedly extending grooves, and the connection contacts being present adjacent the lower surface of the envelope.

7. A battery-operated device as claimed in claim 6, wherein the envelope is provided with external asymmetrical locating portions for cooperating with correspondingly shaped and placed locating portions of the battery-operated device so as to prevent an incorrect placement of the battery unit.

8. A battery unit for a battery-operated device, said battery unit comprising:

an envelope within which at least one electrochemical cell is present, and electrical connection contacts, said envelope substantially being shaped as a closed rectangular block with a rectangular upper surface, a rectangular lower surface opposite thereto, long sides surfaces, and short side surfaces, grooves being present adjacent the long side surfaces of the envelope for guiding the battery unit with sliding possibility in mating ridges of a housing of the battery-operated device, said grooves of said envelope uninterruptedly extending along the long side surfaces of said envelope, and said mating ridges of said housing being uninterruptedly extending ridges, and the connection contacts being present adjacent the lower surface of the envelope.

9. A battery-operated device provided with a housing and with a battery unit, said battery unit comprising:

an envelope within which at least one electrochemical cell is present, and electrical connection contacts, said envelope substantially being shaped as a closed rectangular block with a rectangular upper surface, a rectangular lower surface opposite thereto, long side surfaces, and short side surfaces, grooves being present adjacent the long side surfaces of the envelope for guiding the battery unit with sliding possibility in mating ridges of a housing of the battery-operated device, said grooves of said envelope uninterruptedly extending along the long side surfaces of said envelope, and said mating ridges of said housing being uninterruptedly extending ridges, and the connection contacts being present adjacent the lower surface of the envelope.

* * * * *